United States Patent [19]

Sigworth

[11] 3,967,064

[45] June 29, 1976

[54] LOW NOISE ELECTRONIC CIRCUIT, TRANSDUCER USING THE SAME, AND METHOD

[75] Inventor: Frederick J. Sigworth, Orinda, Calif.

[73] Assignee: Systron Donner Corporation, Concord, Calif.

[22] Filed: Apr. 28, 1975

[21] Appl. No.: 572,267

Related U.S. Application Data

[63] Continuation of Ser. No. 307,110, Nov. 16, 1972, abandoned.

[52] U.S. Cl. ................................... 179/1 P; 328/1; 340/262
[51] Int. Cl.² ........................................... H04R 3/00
[58] Field of Search ...................... 179/1 P; 328/1; 307/308; 331/65; 340/186, 262

[56] References Cited
UNITED STATES PATENTS

| | | | |
|---|---|---|---|
| 2,979,670 | 4/1961 | Unger | 331/65 |
| 3,109,145 | 10/1963 | Morris et al. | 328/1 |
| 3,151,487 | 10/1964 | Schuck | 340/262 |
| 3,524,177 | 8/1970 | Ohno | 340/186 |

Primary Examiner—Douglas W. Olms
Attorney, Agent, or Firm—Flehr, Hohbach, Test, Albritton & Herbert

[57] ABSTRACT

An electronic circuit and method used in conjunction with transducers for eliminating noise signals which includes an AC source of excitation for first and second transducer coils, called pickoff coils located in first and second signal channels. Output from the pickoffs is supplied to detectors disposed in each of the signal channels. The detected pickoff output signals are filtered and connected to a summing circuit wherein the internally generated noise from the AC source appearing as common mode signals in both signal channels is cancelled and differential mode signals produced in said channels are added to produce an output.

15 Claims, 6 Drawing Figures

LOW NOISE ELECTRONIC CIRCUIT, TRANSDUCER USING THE SAME, AND METHOD

This is a continuation, of application Ser. No. 307,110 filed Nov. 16, 1972.

BACKGROUND OF THE INVENTION

The present invention relates to low noise electronic circuitry and more particularly to such circuitry for use with transducers.

All electronic circuit components internally modulate electrical signals producing internally generated noise due to some finite value of random internal electronic motion. This characteristic is more pronounced in active circuit components and places a minimum noise level on signals emanating from circuits using semi-conductor elements. Additional difficulty has been experienced in the past with circuitry provided in electro-mechanical transducers, such as the circuitry disclosed in U.S. Pat. No. 3,109,145. Such a circuit requires feedback means for acceptable operation because the active circuit components have widely varying gain characteristics caused by changes in ambient temperature and physical variation within a component group. The active components have limiting signal levels to which they may be exposed and beyond which they suffer permanent structural damage. The resulting functional variations can only be controlled within the narrow operating limitations by providing feedback within input circuit to closely control the amount of drive at the inpu to maintain normal operating levels within the circuit.

Many circuits operating in conjunction with electro-mechanical transducers provide a signal proportional to the transduced quantity which is detected and amplified by a high gain amplifier. A minute amount of noise modulation by the active circuit components is amplified by a large factor; for example, 1,000. Amplifier output as a consequence provides an erroneous indication of the quantity being monitored.

Whenever requirements arise calling for the conversion of the deflection of a moving system into an electrical output with an accompanying wide band width of flat response, the physical displacement must be by design small, so that the natural frequency of the mechanical system will be high. In such cases, the noise level of the transducer and its electronics becomes a limiting factor in system performance. Obviously a need exists for a low noise electronic circuit independent of such internal noise modulation for use with transducers of the above type.

SUMMARY AND OBJECTS OF THE INVENTION

One embodiment of the low noise electronic circuit and method for use with transducers has an AC source, the output of which is used to drive variable Q pickoff coils located each in two separate signal channels. The pickoffs are series tuned to resonance to provide for a maximum signal to noise ratio. A moving member is disposed within a magnetic field between the pickoffs and is displaced due to the effect of a quantity being measured. Output from the two pickoffs is converted to DC signals of opposite polarity which are smoothed in filters and presented to a summing network wherein AC source internally generated noise transmitted through each of the two signal channels as common mode signals cancels due to the opposite polarity and identical amplitude. Noise levels lower than those produced internally in the AC source are presented at the output of the summing network. Pickoff output induced by the effect of the transduced quantity causing the moving member to be displaced within the magnetic field between the pickoffs appears in the two signal channels as differential mode signals but of like polarity due to the inversion of one of the DC signals and is summed and presented noise free at the output of the summing network.

In general it is an object of the present invention to provide an electronic circuit and method for use with a transducer which is independent of the noise produced internally in the AC source.

Another object of the invention is to provide an electronic circuit and method for use with a transducer of the above character which provides low output noise without a feedback path to control the AC source amplitude.

Another object of the invention is to provide an electronic circuit and method for use with a transducer of the above character which combines noise signal cancellation with AC source amplitude control feedback to obtain the ultimate in low output signal noise.

Another object of the invention is to provide an electronic circuit and method for use with a transducer of the above character which provides high signal to noise ratio by using high pickoff drive signals limited only by pickoff coil power dissipation capability.

Another object of the invention is to provide an electronic circuit and method for use with a transducer of the above character which limits the noise in the two signal channels to coherent or synchronous noise only so that it may be cancelled directly in the summing means.

Additional objects and features of the invention will appear from the following description in which the preferred embodiments have been set forth in detail in conjunction with the accompanying drawings.

DESCRIPTION OF THE PREFERRED EMBODIMENTS

In describing the preferred embodiments certain terminology will be used which has gained wide acceptance with persons skilled in this field of art. Reference to "active devices" as used herein includes any device where an equivalent circuit of the device would include an energy source. Such devices would include electrical energy generators, semiconductor devices, and vacuum tubes. An input noise characteristic for an active device is defined as the input noise that would appear at the output for a gain through the device of unity using a conventional noise test circuit. Common mode signals are synchronous signals arising from a common source. Differential mode signals are synchronous signals which display a differential change in amplitude at their respective sources. The term "elements" when used herein in reference to active components such as semiconductor devices or vacuum tubes, refers to the number of separate terminals carried by the active device in the manner of the accepted vacuum tube terminology. The term "pickoff means" refers to a general transducer element. The term "pickoff coils" refers to wire wound transducer coils which are the generating means for electrical signals proportional to a quantity being measured.

Figure 1:
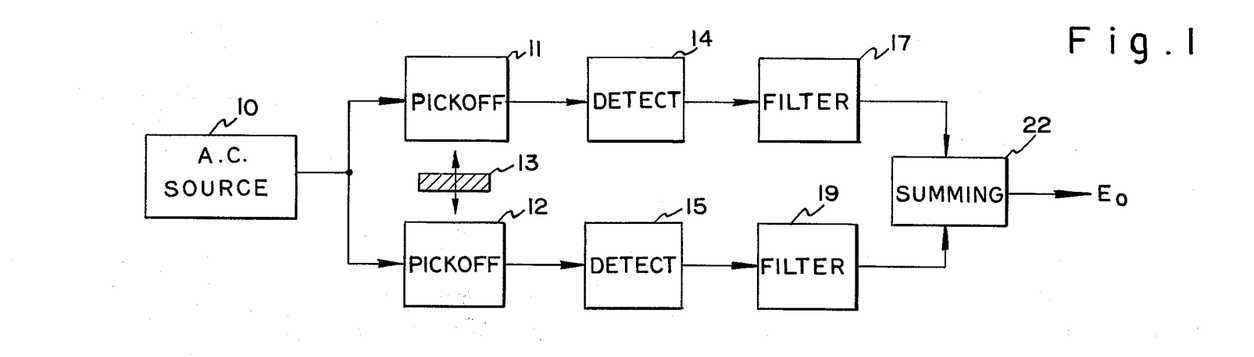
FIG. 1 is a block diagram of the low noise electronic circuit for use with transducers without AC source control feedback.

As seen in FIG. 1 the most general configuration of the low noise electronic circuit described herein consists of an AC excitation source 10 and a pair of spaced pickoff means 11 and 12 excited by the AC source 10 and providing output to two separate signal channels. A moving element 13 is disposed between the pickoffs 11 and 12 and is capable of modifying the magnetic field existing between them producing differential output signals from the pickoffs. Detector means 14 and 15 convert the AC output signals into DC signals in the signal channels and filter circuits 17 and 19 smooth the detected DC levels. The two rectified and smoothed signals from the pickoffs are presented from each of the two signal channels to a summing network 22 which combines the signals, cancelling noise appearing as common mode signals and summing the differential mode signals representing the summation as an output proportional to the displacement of the moving element.

Figure 2:
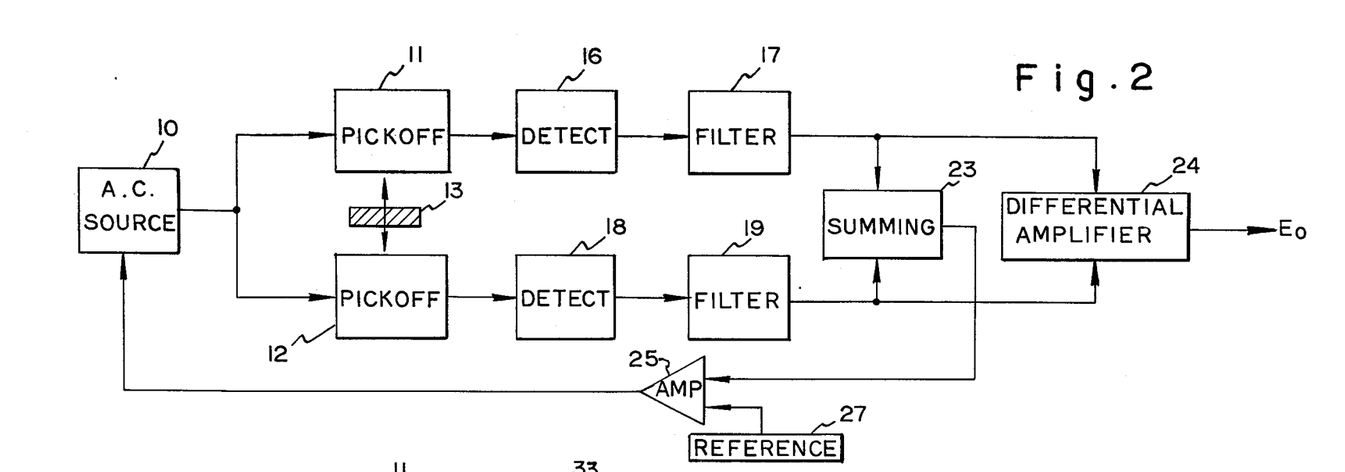
FIG. 2 is a block diagram of the low noise electronic circuit with identically connected detectors and AC source control feedback.

Referring to FIG. 2 there is a block diagram of one embodiment which illustrates the cooperation between an AC source, a transducer movable element, the low noise circuit, and feedback to control AC source amplitude. In this embodiment the noise signals appearing as common mode or synchronous signals are maintained as signals of like polarity through the choice of configuration for the detectors. This requires a summing of the common mode signals from the two signal channels for the feedback to control AC source amplitude and a differencing of the signals from the two channels to cancel common mode signal at the circuit output which then exists as the sum of the differential mode signals alone. The diagram of FIG. 2 shows an AC source 10 which excites both pickoffs 11 and 12 in first and second signal channels with a moving element 13 disposed between them. The pickoffs 11 and 12 are preferably, but not necessarily, the resonant type disclosed in U.S. Pat. No. 3,321,753. One signal channel exists in which the pickoff 11 is connected to a detector 16 which in turn provides an input to filter 17. A second channel includes pickoff 12 connected to a detector 18 which in turn supplies an input to filter 19. Detectors 16 and 18 are configured to provide like polarity output signals. Matched filters 17 and 19 provide smoothed detected inputs to a summing network 23 and a differential amplifier 24. Summing network 23 is, in this embodiment, a preamplifier which sums the common mode current from the two signal channels and directs it to a feedback amplifier 25 for controlling the output level of AC source 10. Amplifier 25 is provided with a control reference level 27 which defines the amplitude at which the AC source 10 is regulated. The differential amplifier 24, sensitive only to differential mode signals from the two channels, provides the circuit output signal, free of coherent or synchronous noise due to its common mode rejection characteristic.

Figure 3:
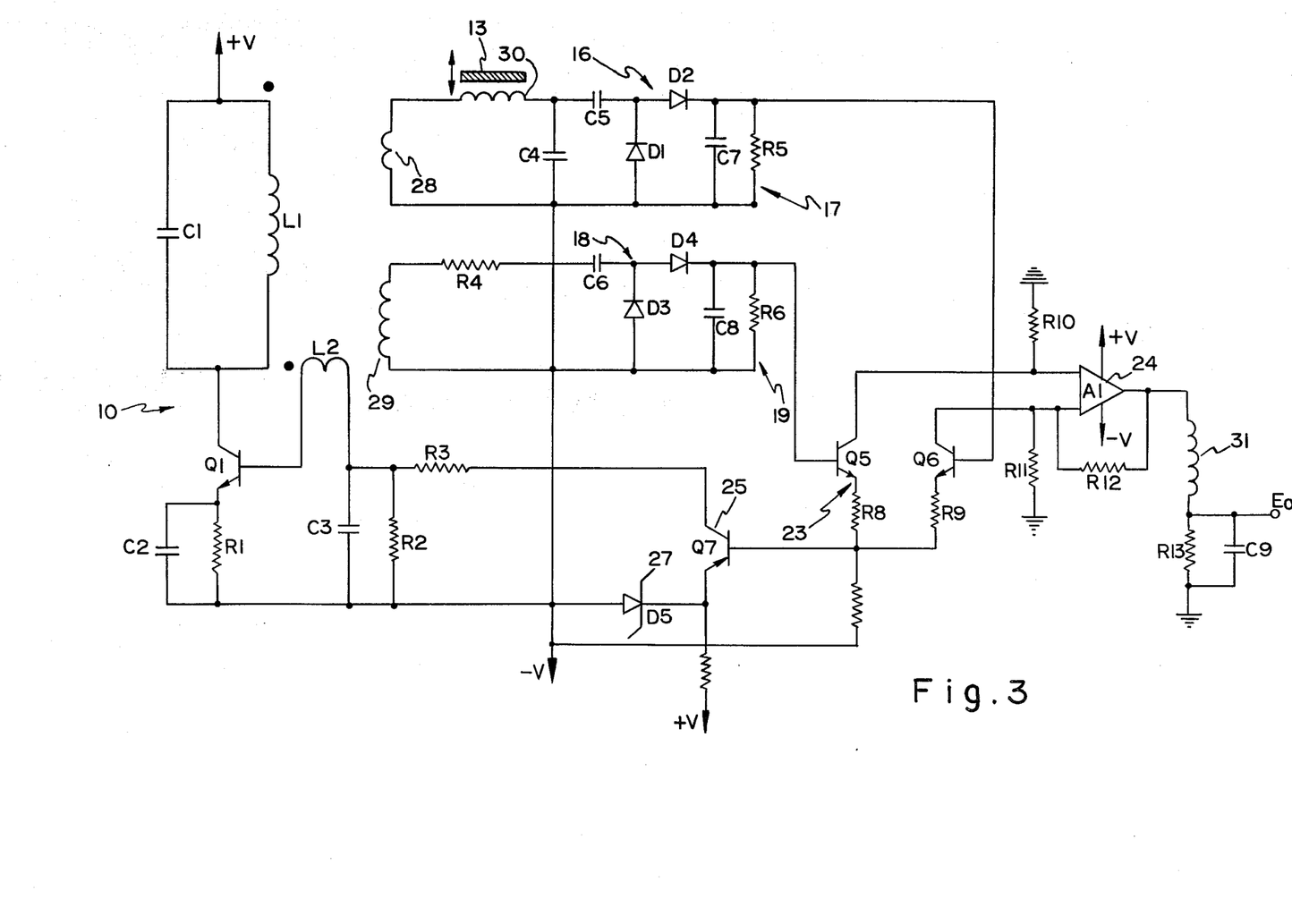
FIG. 3 is a schematic diagram of the low noise electronic circuit with identically connected detectors and AC source control feedback.

The circuit configuration represented in the block diagram of FIG. 2 may be seen in FIG. 3. The AC souce 10 is comprised of a tank circuit containing a capacitor C1 and an inductance L1. Inductance L1 is the primary winding on a transformer T1. The tank circuit is connected between a positive voltage source and the collector of a transistor Q1. The base of transistor Q1 is driven by a winding L2 on transformer T1. The tank circuit, transistor Q1, and winding L2 comprise an oscillator which excites separate secondary windings 28 and 29 on transformer T1. A pickoff coil 30 is in turn excited by secondary winding 28. In this embodiment the output from secondary winding 29 is scaled by resistor R4 to provide an output equivalent to the output from coil 30 when the quantity to be measured is in its zero state. The signal channels are generally balanced for zero input state, in some fashion such as this. A dummy pickoff coil may be utilized in lieu of resistor R4.

Pickoff coil 30 is series tuned to resonance by a capacitor C4 thereby amplifying the excitation provided by secondary winding 28. The amount of drive delivered to pickoff coil 30 by the excitation from secondary winding 28 and the resonance obtained through series tuning with capacitor C4 is limited only by the power dissipation capabilities of the coil 30 itself.

The AC signal from coil 30 is coupled to the detector 16 through a capacitor C5. The scaled AC signal from secondary winding 29 is coupled to the detector 18 through a capacitor C6. Detector 16 and 18 are connected in identical fashion to provide signals of like polarity which are smoothed in the two matched filters represented by the capacitor-resistor combinations C7-R5 and C8-R6.

The summing network 23 consists of transistors Q5 and Q6. Transistor Q5 receives the reference channel output from detector 18 at its base connection. Transistor Q6 receives the signal channel output from detector 16 at its base connection. Low noise components are required for transistors Q5 and Q6 since they amplify the desired output signal and the component input noise characteristic as well.

The equivalent noise level at the input of the differential amplifier 24 is the square root of the sum of the squares of the two major noise components. The gain factor and input noise characteristic of preamplifier 23 produce a product which is one noise component. The input noise characteristic of the differential amplifier 24 is the other. The input noise of the summing network 23 is amplified, along with the desired signal, by the gain of Q5 and Q6. Assuming the input noise characteristics of the summing network components times the selected gain of summing network 23 is greater in amplitude than the input noise characteristic of the differential amplifier 24, the latter's input noise becomes effectively determined by the predominating amplified input noise level of the summing network 23.

Common mode currents arriving through the signal channel and the reference channel are synchronous in nature and of like polarity due to the connection of detectors 16 and 18 as mentioned above. These currents are summed as the emitter currents from Q5 and Q6 and are utilized to drive a feedback amplifier 25, release the same so that the sub-frame 15 may be elevated. The latch dog has a cam surface 92 which is engaged by the channel 18 of the sub-frame when the latter nears horizontal position to swing the dog in the direction opposite to the arrow 90 until the sub-frame channel 18 rests on the main channel 10, whereupon the spring will urge the latch dog to engage over the channel 18.

The latch means 85 is shown disposed at an angle to the vertical and spaced lugs 93 are welded to the sub-frame channel 18 at a complementary angle. As seen by the dot-dash lines in FIG. 2, the lugs 93 will be moved to straddle the latch dog when the sub-frame S rests on the main frame F to absorb forward and rearward thrust forces of the fifth wheel load.

As shown in my patent 3,207,338, a fluid cylinder 95 (shown only in FIG. 2) may have its blank end pivotally connected to a rod 96, extending crosswise of the sub-frame channels 18. The piston rod 97 of the cylinder is pivotally connected to ears 95.1 (see especially FIG. 9) extending from the midpoint of a tube 98 which is welded to and disposed crosswise of the vertical tubes 60, 60. A manually controlled valve, as shown in said patent, may be controlled by the operator to extend the piston rod 97 and thereby maintain the tines of the fork lift in substantially horizontal position as the sub-frame is elevated through its arcuate path to various elevations.

Also, as shown in my patent 3,207,338, a sheave 99 (shown only in FIG. 2) may be rotatably mounted on cross rod 63. A flexible cable 100 is trained over the sheave 99 and has a hoisting hook 101 at its free end. The other end of the cable may be wound on a cable storage drum (not shown but similar to that shown in my said patent) and a crank may be provided to rotate the drum.

In order to hold the fork lifts in the position shown in dotted lines in FIG. 1 and full lines in FIG. 9, and to reduce rattling thereof, a pair of steel straps 102, each of Z formation, may have one end 102.1 connected to the cross tube 98 by means of a wing bolt 102.2 and its other end 103 engaged over the vertical portion of the fork lifts 65. It will be appreciated that at this time, the fork lifts have been adjusted along the cross member 64 so that they are aligned with respective channels 18 of the sub-frame 15.

Figure 4:
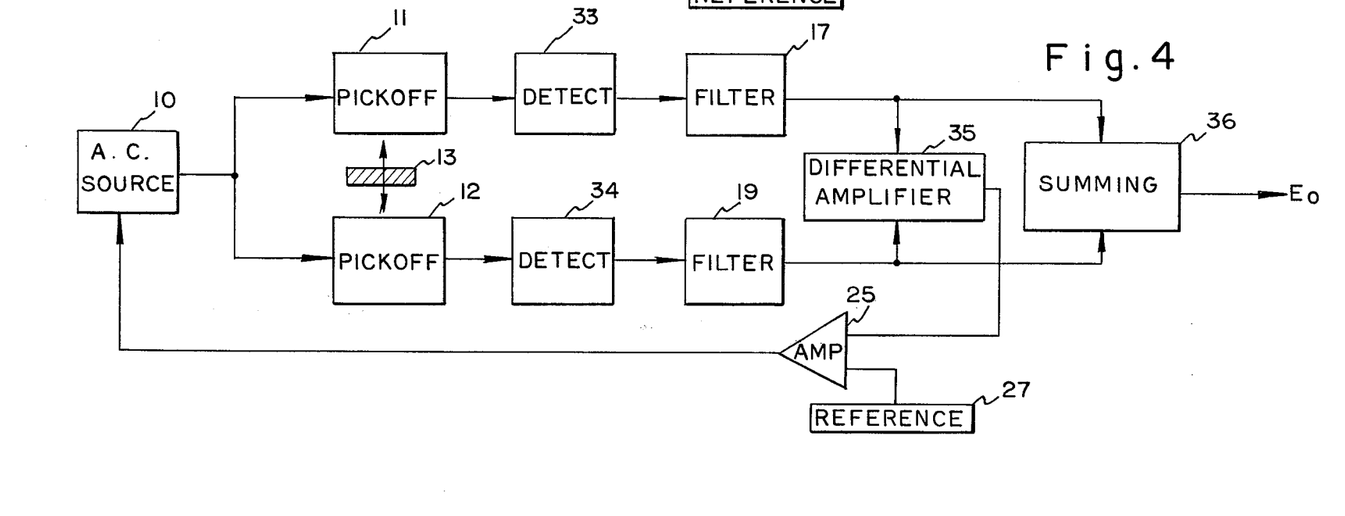
FIG. 4 is a block diagram of the low noise electronic circuit with reverse connected detectors and AC source control feedback.
Figure 5:
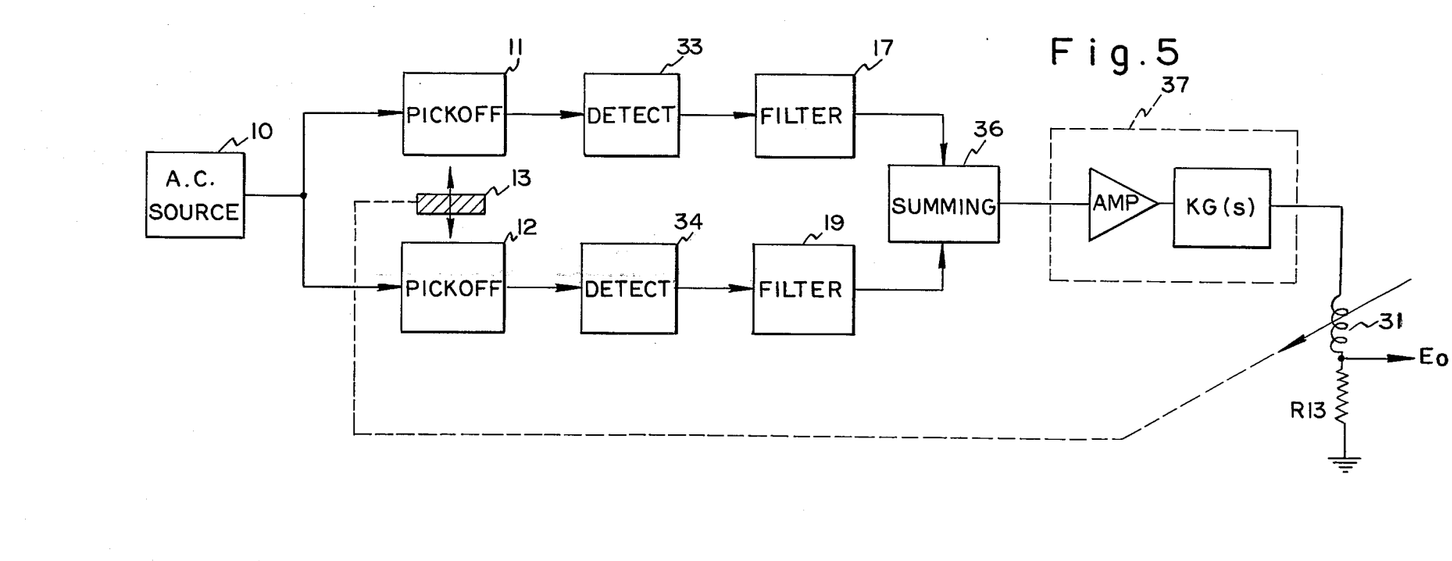
FIG. 5 is a block diagram of the low noise electronic circuit without AC source control feedback and shown in association with a closed servo loop.
Figure 6:
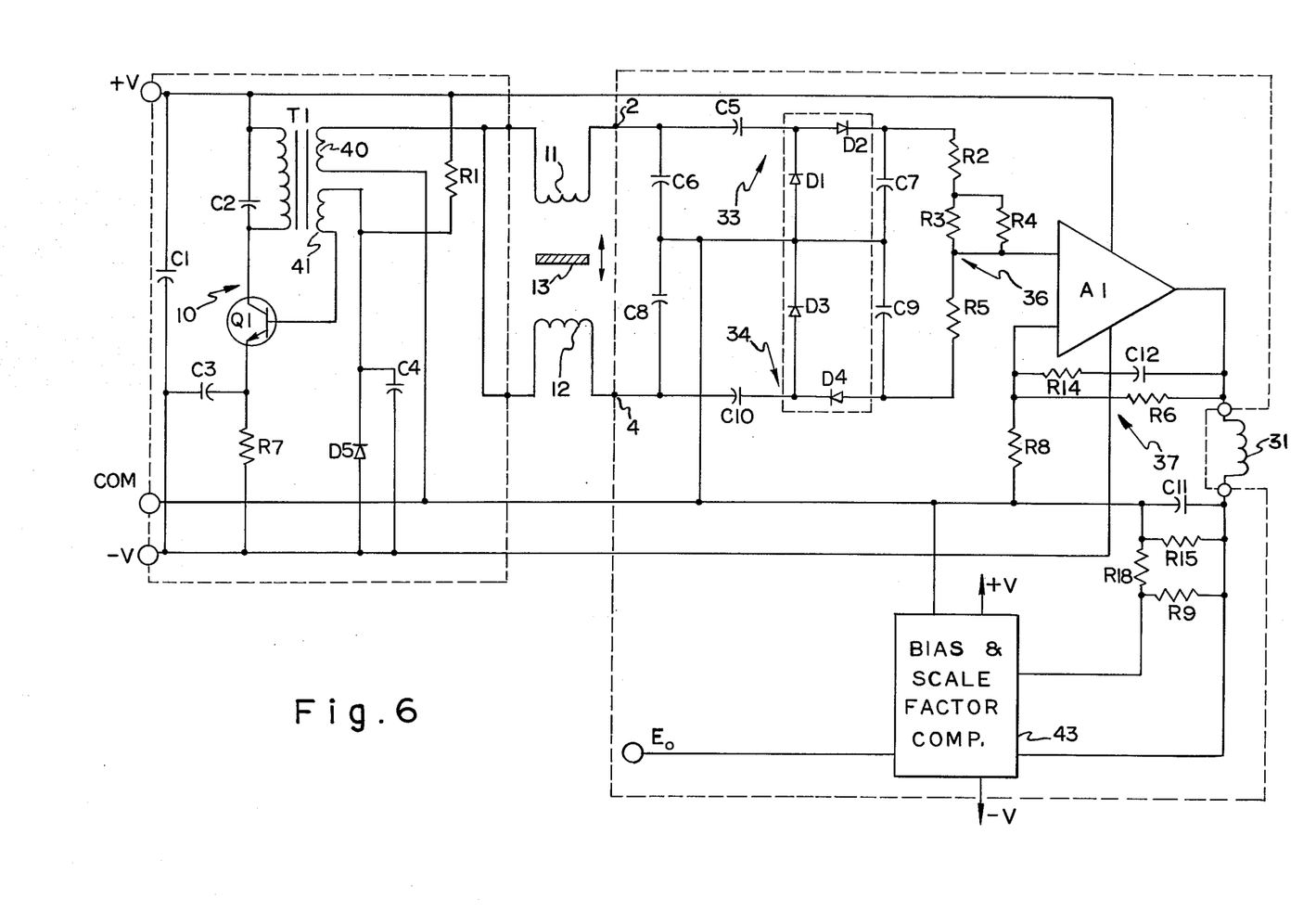
FIG. 6 is a schematic diagram of the low noise electronic circuit without AC source control feedback and shown in association with a closed servo loop.

As seen only in FIG. 4, a pair of spaced horizontally disposed metal brackets 104 may be welded to a metal plate 104.1 which in turn is welded crosswise of the rear ends of the main frame channels 10, 10. The brackets 104 are formed with vertically aligned openings 104.2 which are adapted to receive a pintle pin (not shown) for connecting the forward end of a draft link (also not shown). Thus, the tractor T is adapted to tow a conventional four wheel vehicle.

As seen only in FIG. 3, planks 18.1 may be secured crosswise of and to the upper surfaces of the sub-frame channels 18, 18, to form a flat bed to support a load. In this case, the sub-frame is preferably not provided with a fifth wheel 36 so that the bed may be extended to the rear end of the sub-frame. To increase utility of the vehicle, the ears 33 which support the fifth wheel may be removably connected to the sub-frame channels 18, 18 so that the fifth wheel may be installed, when and if desired.

To further increase utility of the vehicle, the bed may be provided with opposite sides (as shown by dot-dash lines 18.2 in FIG. 2) and the bulkhead 18.3. A door 18.4 may be provided in the forward end of one or both sides 18.2 so that loose material, such as construction aggregates, may be removed from the container formed by the bed 18.1, the sides 18.2 and the bulkhead 18.3. This adaptation of my invention is ideally suited for use by contractors engaged in construction work located a considerable distance from the storage yard. The contractor may load loose aggregates in the container on the sub-frame S and may load palletized material, such as bricks, siding or dry wall board on a four wheel vehicle towed by the tractor. At the building site, the aggregates may be removed from the container carried by the sub-frame S and the lift forks 65 may be used to remove the palletized material from the four wheel vehicle. The hoist hook 101 may be used to move heavy material or to erect or transport building beams, or to remove beams and the like from the four wheel vehicle.

DESCRIPTION OF OTHER EMBODIMENT

In FIGS. 7 and 8, a slightly different support for the fork lifts 65a is shown, and the fork lifts are modified to provide a hook 105 at the upper end thereof. A pair of steel plates 106, 107 are welded to, and extend crosswise of, the metal tubes 60a, and the latter, as before, are pivoted to the ends of the channels 18a of the sub-frame 15a. Each metal tube 60a has an opening 108 formed by cutting away walls of the tube.

In this embodiment, the fork lifts 65a are detachable and when not in use may be stored in the tractor cab or any suitable carrying place on the tractor. The hooks 105 of the fork lifts may be engaged over the upper edge portion of the plate 106 at any related position therealong, the upright portion of the fork lift bearing against the plate 107 to prevent such upright portion from swinging in a direction toward the forward part of the tractor.

Any suitable means may be provided to prevent the hooks 105 from moving longitudinally along the plate 106, such as the serrations 72 shown in FIG. 4. As seen in FIG. 7, cross slots 110 may be formed in the upper edge portion of the plate 106, each slot being adapted to receive the width of a hook. The hooks 105 may also be seated within an opening 108 in a metal tube 65a so that full adjustment of the fork lifts crosswise of the rear of the sub-frame 15a is provided.

The construction illustrated in FIGS. 7 and 8 is also ideally suited to provide mud flaps 111 rearwardly of and in alignment with each rear wheel of the tractor. In this embodiment, brackets 112 are welded to the lower edge of each plate 106, 107, each bracket having an angular leg 113 to which may be bolted a metal backing plate 114 for the rubber or canvas flap 115.

FIG. 10 illustrates a manner in which my improved construction may be used to secure additional elevation for the fork lift arrangement and similar reference numerals will be used to designate similar parts. In FIG. 10, the fork lift support of FIGS. 7 and 8 is illustrated, with the support shown in two vertical positions, a lower one shown in dot-dash lines, and an upper one shown in full limes.

The metal tubes 60a, as in FIGS. 7 and 8, are pivotally connected to the rear ends of the channels 18a of sub-frame 10a by a cross-shaft. The steel plates 106, 107 are welded crosswise of the tubes 60a to maintain lateral alignment and effect unitary movement. Matching pairs of ears 125, 126 are welded to the front and rear surfaces of respective tubes 60a. A cross-shaft 127 is adapted to be disposed through aligned holes in either of the paired ears 125, 125 or 126, 126.

A fluid cylinder 128 has its blank end pivotally carried by a shaft which extends crosswise of the channels 18a and preferably this cylinder is of the telescoping type to provide for maximum rod extension. The end of the cylinder rod 129 is pivotally connected to the cross-shaft 127.

As seen in dot-dash lines in FIG. 10, the fork lift support is in its lower position wherein the tubes 60a extend vertically downwardly from their pivot with the rear ends of the channels 18a. The cross-shaft 127 is seated within aligned holes in the ears 125, which now face rearwardly, and the rod end of the cylinder 128 is connected to the cross-shaft. By control of fluid to the cylinder, the tubes 60a may be held vertical, or at any other desired angularity. In this case the hooks 105 of the fork lift 65a engage over plate 107, which now is lowermost.

The fork lift support may be shifted to its upper position shown in full lines in FIG. 10 with a minimum of effort. First of all, the fork lifts 65a are preferably removed from their support. Then, the cross-shaft 127 is withdrawn from the ears 125 and the tubes 60a are swung in a counter clockwise direction about their pivots with the channels 18a to the upstanding vertical position. The cross-shaft 127 is disposed through aligned holes in the ears 126 which now face rearwardly, with the end of the rod 129 connected to the shaft. The fork lifts 65a are then hooked over the cross plate 127.

In some cases it is desirable that the rear end of the sub-frame be shifted an even greater distance beyond the rear end of the tractor, and FIG. 10 shows one way this may be easily accomplished. Instead of rigidly connecting the horizontal and vertical components 18 and 19 of each sub-frame arm 15, these components may be pivoted together as shown at 130, so that the angle between them may be varied from the right angled relationship to an obtuse angle, for example, whereby the rear end of the sub-frame is projected a greater amount beyond the rear of the tractor.

An extensible-retractible brace is pivotally connected between the legs 18 and 19 to hold the same in a fixed angular relationship. In FIG. 10, a fluid cylinder 131 is provided for this purpose since by regulation of the fluid supplied to the cylinder, the angle between the legs 18 and 19 may be easily changed.

I claim:

1. A roadway tractor for towing a semi-trailer having the usual fifth wheel plate, said tractor including a horizontal frame and wheels connected to and supporting the frame from a roadway, the improvement comprising:

upright support means having its lower end connected to a forward part of said frame and its upper end disposed a considerable distance above said frame, a sub-frame having a first portion carrying a fifth wheel for engagement with said fifth wheel plate, said first portion being normally horizontal in juxtaposition to said frame, said sub-frame also having an upright second portion rigidly connected to said first portion with its upper end pivoted to the upper end of said support means, whereby said sub-frame may be swung about the pivot to elevate its normally horizontal first portion and in so doing causing the rear part of said first portion and said fifth wheel to move in a direction rearwardly of said frame, means for effecting pivotal movement of said sub-frame, said frame including a pair of laterally spaced longitudinally extending beams, said sub-frame first portion including a pair of beams longitudinally aligned with said frame beams and resting thereon in normally horizontal position, and metal side plate secured to each beam of said sub-frame first portion and depending therefrom, each plate cooperating with a side portion of a respective frame beam to maintain longitudinal alignment of said frame and sub-frame in horizontal position.

2. The construction according to claim 1 wherein said side plate has at least one opening aligned with an opening in said frame when said sub-frame first portion is in horizontal position, and pins closely passing through said aligned openings for holding said sub-frame first portion in horizontal position and for relieving the sub-frame pivot of longitudinal stresses applied to the sub-frame through said fifth wheel.

3. The construction according to claim 1 wherein the rear end of each sub-frame beam has a metal member pivotally connected thereto, a cross bar rigidly connected across said metal member, and fork lift means carried by said cross bar and disposed at selected positions therealong for adjustment transverse of the longitudinal axis of eaid tractor.

4. A roadway tractor for towing a semi-trailer having the usual fifth wheel plate, said tractor including a horizontal frame and wheels connected to and supporting the frame from a roadway, the improvement comprising:

upright support means having its lower end connected to a forward part of said frame and its upper end disposed a considerable distance above said frame, a sub-frame having a first portion carrying a fifth wheel for engagement with said fifth wheel plate, said first portion being normally horizontal in juxtaposition to said frame, said sub-frame also having an upright second portion rigidly connected to said first portion with its upper end pivoted to the upper end of said support means, whereby said sub-frame may be swung about the pivot to elevate its normally horizontal first portion and in so doing causing the rear part of said first portion and said fifth wheel to move in a direction rearwardly of said frame, means for effecting pivotal movement of said sub-frame, said frame including a pair of laterally spaced longitudinally extending beams, said sub-frame first portion including a pair of beams longitudinally aligned with said frame beams and resting thereon in normally horizontal position, and, cross beams rigidly secured between the beams of said frame and said sub-frame respectively, wherein one of said cross beams has an upright pin and the other is provided with an opening to closely said pickoff means, detector means connected to the output of each of said signal channels, and means for summing the outputs of the channels, including a preamplifier for receiving the outputs from the signal channels and producing an output, and a differential amplifier connected to receive the output of said preamplifier and producing an output, said preamplifier and said differential amplifier each having respective input noise characteristics, said preamplifier input noise characteristic being less than said differential amplifier input noise characteristic, whereby said preamplifier operates to provide a predominant noise component at the output thereof, which when combined with the differential amplifier input noise characteristic provides a high signal to noise ratio at the output of said differential amplifier, said means forming first and second signal channels being free of active devices having three or more electrodes to thereby minimize internally generated asynchronous noise in the channels.

2. A transducer as in claim 1 together with filter means in each channel connected to the detector.

3. A transducer as in claim 1 wherein said preamplifier consists of two low-noise transistors of the type having a base, an emitter, and a collector connection, a connection from each of said signal channel outputs to a separate one of the base connections, said preamplifier output appearing between said collectors, a connection from each of said collectors to said differential amplifier input, and a common emitter connection between said low-noise transistors, whereby differential mode signals received from said channels are amplified prior to connection to said differential amplifier and common mode signals received from said channels are summed at said common emitter connection.

4. In a low noise electronic circuit for use with transducers of the type having first and second signal channels, an AC source for exciting said first and second signal channels, first and second pickoffs located in said first and second signal channels respectively connected to said Ac source and producing first and second signals, and a movable element disposed between said first and second pickoffs, a tuned circuit in each of said first and second signal channels including said first and second pickoffs for increasing said AC source excitation in said pickoffs limited only by the power dissipation characteristics of said pickoffs, means for detecting said first and second signals producing DC signals of opposite polarity, said detecting means minimizing injection of asynchronous noise into said channels, means for summing said DC signals whereby common mode signals are cancelled and differential mode output signals are added, and amplifying means for receiving said added differential mode signals and for shaping signal response characteristics.

5. In a low noise electronic circuit for use with transducers of the type having first and second signal channels, an AC source for exciting first and second pickoffs located in each of said first and second signal channels and producing first and second signals therein, and a movable element disposed between said pickoffs, means for amplifying said AC source excitation in said pickoffs limited only by the power dissipation characteristics of said pickoffs, means for detecting said signals in each of said first and second channels producing DC signals of like polarity said detecting means minimizing injection of asynchronous noise into said channels, means for summing and amplifying the common mode output and the differential mode output from said signal channels, a differential amplifier sensitive to said amplified differential mode output for providing system output, a feedback path, an amplifier disposed in said feedback path sensitive to said amplified common mode output, and output from said amplifier in said feedback path providing negative feedback to said AC source, said feedback operating to further reduce residual output noise by reducing common mode level variations in said channels.

6. A low noise electronic circuit for use with transducers as in claim 5 wherein said means for summing and amplifying the common mode output and the differential mode output from said signal channels comprises a low noise transistor pair of the type having base, emitter, and collector connections disposed to each receive the output from one of said signal channels at their base connections, whereby an amplified differential output is provided between one pair of output points for the pair and a summed and amplified common mode output is provided at another common pair of output points.

7. The method of providing a low noise electronics circuit for use with transistors, comprising the steps of generating an AC excitation signal, exciting a pickoff in each of said two separate signal channels by directly connecting the pickoffs to the AC signal, tuning each of said pickoffs to increase said AC excitation signal limited only by the power dissipation capability of said pickoffs, moving a conductive element between said pickoffs to produce an output signal in each of said signal channels, detecting said output signals, cancelling internally and externally generated noise from said AC excitation generator appearing as common mode signals at the output of said two separate signal channels, and adding electrical output from said pickoffs appearing as differential mode signals at the output of said two separate signal channels.

8. The method of providing a low noise electronics circuit for use with transducers as in claim 7 wherein detecting said output signals and summing said detected signals comprises receiving the output from one of said pickoffs in one channel, detecting said ouptut to obtain a positive signal, receiving another output signal from the other of said pickoffs in the other of said channels, detecting said other output signal to obtain a negative signal, and summing said positive and negative signals in a resistance network.

9. The method of providing a low noise electronics circuit for use with transducers as in claim 7 wherein detecting said output signals and summing said signals comprises receiving the output from said pickoffs in each channel, detecting said outputs to obtain signals of like polarity, and differencing said signals in a differential amplifier.

10. The method of providing a low noise electronic circuit for use with transducers as in claim 7 together with feeding back common mode signals from said summing means to said AC excitation generator, and amplifying the common mode signals, the amplified common mode feedback operating to reduce common mode oscillations in said AC excitation generator.

11. In a low noise electronic circuit for use with transducers of the type having first and second signal channels, an AC source for exciting first and second pickoffs located in each of said first and second signal channels and producing first and second signals therein, a movable element disposed between said pickoffs, a tuned circuit in each of said first and second signal channels including said first and second pickoffs for increasing said AC source excitation in said pickoffs limited only by the power dissipation characteristics of said pickoffs, means for detecting said first and second signals producing DC signals of predetermined polarity, said detecting means containing electronic circuit elements having no more than two electrical terminals, thereby minimizing injection of asynchronous noise into said channels, and means for combining said DC signals whereby common mode noise signals are cancelled and differential mode output signals are added.

12. A low noise electronic circuit as in claim 11 wherein said detector is configured to produce DC signals of opposite polarity, and wherein said means for combining comprises a summing network for adding said first and second signals, and means for amplifying connected to receive said added differential mode signals.

13. A low noise electronic circuit as in claim 12 wherein said means for amplifying includes means for shaping signal response characteristics.

14. A low noise electronic circuit as in claim 11 wherein said detector is configured to produce DC signals of like polarity, and wherein said means for combining comprises a differential amplifier sensitive to the difference between said first and second signals for providing system output.

15. A low noise electronic circuit as in claim 11 wherein said means for combining provides a common mode sum output, together with a feedback path, means disposed in said feedback path for receiving said summed common mode output and for providing negative feedback coupled to said AC source for reducing common mode level variations in said first and second signal channels.

* * * * *